United States Patent [19]

Finger

[11] Patent Number: 4,740,754

[45] Date of Patent: Apr. 26, 1988

[54] BIDIRECTIONAL BATTERY STATE-OF-CHARGE MONITOR

[75] Inventor: Eugene P. Finger, Brewster, N.Y.

[73] Assignee: Curtis Instruments, Inc., Mt. Kisco, N.Y.

[21] Appl. No.: 818,198

[22] Filed: Jan. 13, 1986

[51] Int. Cl.[4] .................................................. H02J 7/00
[52] U.S. Cl. ...................................... 324/428; 320/48; 324/427; 340/636
[58] Field of Search ...................... 324/426, 427, 428; 340/636; 320/48

[56] References Cited

U.S. PATENT DOCUMENTS

| 4,151,454 | 4/1978 | Iida | 340/636 X |
| 4,258,306 | 3/1981 | Bourke et al. | 320/48 |
| 4,288,734 | 9/1981 | Finger | 324/428 X |
| 4,388,618 | 6/1983 | Finger | 324/428 X |

FOREIGN PATENT DOCUMENTS

| 2360286 | 6/1974 | Fed. Rep. of Germany | 324/428 |
| 12315 | 6/1980 | United Kingdom | 324/428 |

Primary Examiner—Reinhard J. Eisenzopf
Assistant Examiner—Robert W. Mueller
Attorney, Agent, or Firm—John F. Ohlandt

[57] ABSTRACT

The monitor is a circuit including an integrator for storing a state-of-charge measurement and a charge signal channel and a separate discharge signal channel both arranged for connection to receive a battery terminal voltage signal. The charge signal channel is operable in response to a battery terminal voltage signal above a charge threshold function voltage to produce a charge output signal to change the integrated measurement in the integrator in a first direction to indicate an increased charge. The discharge signal channel is operable in response to a battery terminal voltage signal below a discharge threshold function voltage to produce a discharge output signal to change the integrated measurement in the integrator in a second direction to indicate a decreased charge. Both the charge and discharge threshold function voltages are functions of the stored integrator state-of-charge measurement.

35 Claims, 6 Drawing Sheets

BIDIRECTIONAL BATTERY STATE-OF-CHARGE MONITOR

BACKGROUND OF THE INVENTION

The present invention relates to improved systems for monitoring the charge condition of an electric storage battery such as a lead acid battery. The invention is particularly useful for conditions of operation where varying loads are intermittently applied to the battery, and where the battery may be intermittently subjected to brief intervals of charge current.

Many different approaches have been made to the problem of monitoring and indicating the discharge condition of electric storage batteries, especially in applications where the battery is first charged and then is used in the discharge mode for a considerable period of time, such as in a mobile vehicle, before it is again returned to the charger to be recharged.

One valuable approach to this problem is to use an ampere-hour meter. Very accurate results have been obtained with such meters. However, accuracy is sometimes limited by the fact that the number of ampere hours obtainable from a battery depends very much upon the rate of discharge, fewer ampere hours being available when the battery is rapidly discharged. Other factors which limit a system of pure current measurement are that the amount of energy available from the battery varies with the temperaure of the battery, and with the age of the battery. Furthermore, the ampere-hour meter approach requires insertion in the circuit of some means for measuring current, such as a current measuring shunt. That is not nearly so convenient as simply measuring the battery terminal voltage.

Various battery terminal voltage measurement systems have been employed for the purpose of monitoring battery discharge, with varying degrees of success. The present invention is in this category.

One voltage measurement technique for monitoring battery discharge consists of simply measuring the open circuit battery voltage. The stabilized open circuit battery voltage can be an accurate indication of the discharge state of the battery. However, it may take hours for the open circuit battery voltage to stabilize after each discharge interval, so that the stabilized reading is not available very much of the time. Furthermore, no open circuit battery voltage is available during a loaded condition of the battery.

Another approach is simply to measure and read the instantaneous battery terminal voltage on a continuing basis. However, this requires interpretation, since the terminal voltage varies during operation of the apparatus powered by the battery, having a depressed value during loading, dependent upon the magnitude of the load.

Various unidirectional systems have been devised for detecting and registering downward excursions in battery voltage under load as an indication of the discharge condition of the battery. Some of these have operated on the basis of recognition of a sustained under-voltage condition before any registration is made, and others are really under-voltage analyzers which recognize and register under-voltage conditions in a setting recognizing previously registered under-voltage conditions. Very accurate results have been obtained with such systems, especially when applied to apparatus having known patterns of loading, even where the loading is quite discontinuous, such as in the operation of industrial forklift trucks. Examples of successful systems of this sort are disclosed and claimed in a prior U.S. Pat. No. 4,193,026 issued to Eugene P. Finger and Eugene A. Sands on Mar. 11, 1980 and assigned to the same assignee as the present application.

Another example of a monitoring system in the above category is that disclosed in U.S. Pat. No. 4,560,937 issued on Dec. 24, 1985 to Eugene P. Finger for a Battery State of Charge Metering Method and Apparatus and assigned to the same assignee as the present application.

The above-mentioned prior patents basically involve unidirectional integrations in response to battery terminal voltage reduction events associated with discharge events on the battery. While the systems in each of these two patents include circuit features for recognizing when the battery has been recharged, and for resetting the metering system to reflect that condition, there is no means for measuring the degree of recharge during partial recharging intervals. Thus, the systems of those patents assume that a full charge is accomplished, if prescribed tests are passed. They contemplate that the discharged battery is to be removed and replaced each time with a recharged battery. There is no recognition of a partial recharge, or any provision for bidirectional integration.

Another prior patent which represents a refinement in battery state-of-charge indicators is U.S. Pat. No. 4,388,618 issued June 14, 1983 to Eugene P. Finger for a Battery State-of-Charge Indicator Operating on Bidirectional Integrations of Terminal Voltage and assigned to the same assignee as the present application.

U.S. Pat. No. 4,388,618 does include the feature of bidirectional integration of terminal voltage for the purpose of deriving an accurate measurement of battery state of charge. However, the system of that patent again basically contemplates a battery application where the battery is expected to be removed from the battery utilization apparatus, such as a forklift truck, and then replaced with a recharged battery. The bidirectional integrations of the system of U.S. Pat. No. 4,388,618 including upward voltage responsive integrations, are intended to provide for recognition of the beneficial effect of "rest" periods in the operation of the battery in which the battery terminal voltage actually increases in a voltage recovery characteristic after loading. U.S. Pat. No. 4,388,618 again includes a special reset arrangemennt for quickly resetting the integrator to recognize that the battery has been recharged after the battery is removed, recharged, and replaced.

While U.S. Pat. No. 4,388,618 system operates bidirectionally, and recognizes upward voltage excursions, it is specifically designed only to recognize and respond to upward voltage excursions associated with rest intervals between discharge events, and to respond accurately to such rest conditions. It is not designed to respond to brief, or prolonged, recharge events, and therefore will not respond accurately to such recharge events. For instance, since the system is designed to respond to mere quiescent voltage recoveries when the load is removed, it is too sensitive, and corrects too much in response to brief charging events such as those arising from regenerative braking.

Accordingly, it is an object of the invention to provide an improved battery state-of-charge monitoring circuit which responds accurately to brief charge condition events as well as to brief discharge condition events.

Still other atempts have been made at producing a battery state-of-charge circuit which responds to both charging conditions and discharging conditions. For instance, U.S. Pat. No. 4,258,306 issued Mar. 24, 1981 to Robert F. Bourke and David K. Johansen for a State of Battery Charge Indicator Circuit and assigned to Gould Inc. discloses such a system. However, the system disclosed in that patent apparently requires that the operator insert an input signal to impart the information that the system is in charge mode. In other words, the shift between charge mode and discharge mode is not automatically detected. Furthermore, the system of that patent requires the presence of a current detection signal during discharge mode, but not during charge mode. This is a disadvantage, since it means that current must be detected, and arrangements for detecting current make installation of the state of-charge-circuit more difficult.

Accordingly, it is another object of the invention to provide an improved battery state-of-charge monitor circuit which automatically determines when the system shifts between charge mode and discharge mode, and which does not require any measurement of current beyond those indications of current which are implied from detection of battery terminal voltage.

Further objects and advantages of the invention will be apparent from the following description and the accompanying drawings.

SUMMARY OF THE INVENTION

In carrying out the invention there is provided a battery state-of-charge monitor circuit comprising an integrator for storing a state-of-charge measurement, a charge signal channel arranged for connection to receive a battery terminal voltage signal and connected to said integrator and operable in response to a battery terminal voltage signal in the charge range above a charge threshold function voltage which is a function of the integrator measurment to produce a charge output signal to change the integrated measurement in a first direction to indicate an increased charge, a discharge signal channel arranged for connection to receive a battery terminal voltage signal and connected to said integrator and operable in response to a battery terminal voltage signal in a discharge range below a discharge threshold function voltage which is a function of the integrator measurement to produce a discharge output signal to change the integrated measurement in a second direction to indicate a decreased charge, output means connected to said integrator for indicating the achieved integration value, a charge threshold function generator comprising a part of said charge signal channel and connected to receive a feedback signal from said output means, a discharge threshold function generator comprising a part of said discharge signal channel and connected to receive a feedback signal from said output means, said discharge threshold function generator being operable to generate a discharge threshold function voltage as a function of said feedback signal from said output means, said charge and discharge function generators being operable to generate functions which are separated, with the charge function always being higher than the discharge function.

DESCRIPTION OF PREFERRED EMBODIMENTS

Figure 1:
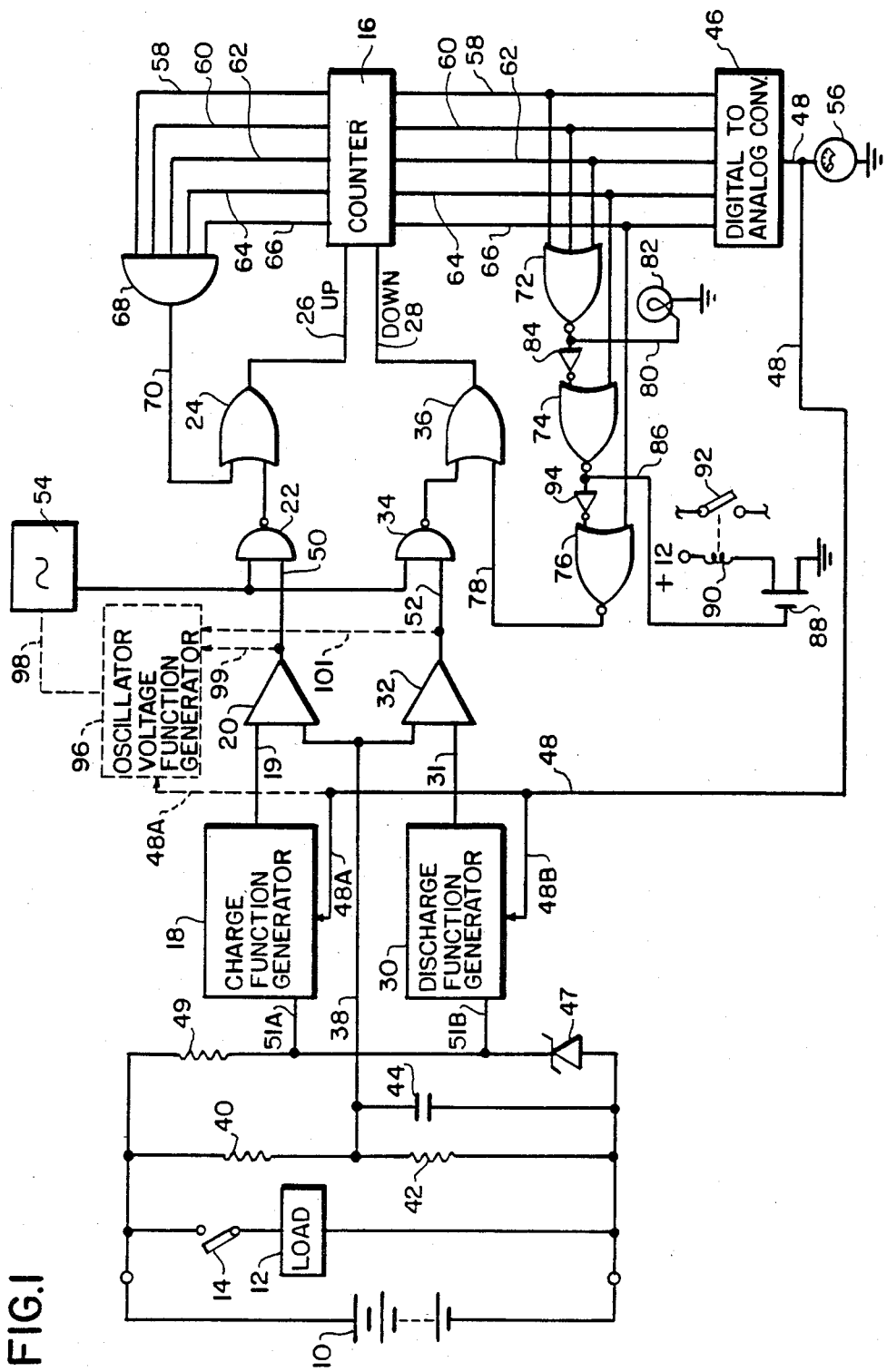
FIG. 1 is a schematic circuit diagram of one preferred embodiment of the invention.

Referring particularly to FIG. 1, there is shown a battery 10, the condition of which is to be monitored, and a load 12 connectable across the battery by means of a switch 14. It will be understood that the load 12 may be a motor and that a sophisticated control system may be employed for that load, rather than the simple switch 14. Such a control system may very well include reversing switches, and electronic "choppers" to modulate the flow of current to the motor for speed control. Furthermore, additional loads may be provided. Thus, if load 12 is the traction motor for a forklift truck, a separate load circuit may be provided for a lift motor.

The monitoring circuit includes an integrator embodied in an up-down counter 16 for storing a state-of-charge measurement. A charge signal channel is connected to the "up" count input 26 to control the up counts in the counter 16. The charge signal channel includes a charge function generator 18, a comparator amplifier 20, a NAND gate 22, and an OR gate 24. The system also includes a discharge sigal channel connected to the down count input 28 of the counter 16 to control "down" counts. The discharge signal channel includes a discharge function generator 30, a comparator amplifier 32, a NAND gate 34, and an OR gate 36.

A battery terminal voltage signal is delivered to each signal channel through a connection 38 to the comparator amplifiers 20 and 32 from a voltage divider including resistors 40 and 42. The voltage divider is connected across the terminals of the battery 10. A capacitor 44 serves, in conjunction with the resistor 40, to provide a low pass filter on the signal line 38. The ratio of the voltage divider resistors 40 and 42 is selected so that the voltage on voltage signal line 38 is a small representative fraction of the total battery voltage.

Each of the charge and discharge signal channels is connected to receive a feedback signal from the integrator, as embodied by the counter 16, by means of a digital-to-analog converter 46, and an analog output line 48 from that converter. Line 48 is connected, as indicated at 48A and 48B, to the charge function generator 18 and the discharge function generator 30. The charge function generator 18 is operable to generate a charge threshold function voltage which is a function of the integrator measurement stored in the counter 16 as determined by the feedback voltage at 48A. Similarly, the discharge function generator 30 is operable to generate a discharge threshold function voltage which is a function of the integrator measurement. Each of the function generators 18, 30 is also supplied with a constant voltage reference (at 51A, 51B) from a circuit connected across battery 10 which includes a zener diode 47 and a dropping resistor 49.

In the charge signal channel, the charge threshold function voltage from function generator 18 is compared with the battery terminal voltage signal on connection 38 in the comparator 20 to produce a charge output signal on connection 50 to the NAND gate 22 only when the battery terminal voltage signal is above the charge threshold function voltage from function generator 18. That signal gates the NAND gate 22 in order to transmit pulses from an oscillator 54 to an OR gate 24. The pulses are normally transmitted through the OR gate 24 to the "up" input connection 26 to the counter 16. The operation of the discharge signal channel is essentially symmetrical to that of the charge signal channel. Thus, the discharge function generator generates a discharge threshold function voltage which is a function of the integrator measurement on connection 48, and that discharge threshold function voltage is supplied to the compare amplifier 32 for comparison with the battery terminal voltage signal on connection 38. Compare amplifier 32 is operable to provide a discharge output signal on connection 52 to the NAND gate 34 only when the battery terminal voltage signal is in a discharge range below the discharge threshold function voltage. Under those circumstances, pulses are gates through from the oscillator 52 to the OR gate 36, and thus to the down count input 28 of the counter 16 to thereby change the integrated measurement in the down direction to indicate a decreased charge.

Connected to the output of the digital-to-analog converter 46, at connection 48, there is provided a voltmeter 56 which serves as a visual readout device for indicating the achieved integration value. Thus, the reading on voltmeter 56 indicates the charge condition of the battery as measured by the system.

It will be understood that a digital output device (not shown) may be connected directly to the output of the counter 16, ahead of the digital-to-analog converter, to provide a digital reading as an alternative output.

The digital output lines of the counter 16 are shown both above and below the counter 16 to promote clarity in the drawing. These lines are numbered 58 through 66, and represent the highest order digital outputs from the counter 16. There may be other lower order digit positions in the counter 16 which are not indicated in the drawing.

When the counter 16 is full, indicating a full charge, a digital 1 is available on all five of the outputs 58–66. As shown above the counter 16, these five outputs are all carried to a five-input AND gate 68. Accordingly, when a "full" indication is available, the AND gate 68 provides a logic 1 output at connection 70 to the OR gate 24. This essentially disables OR gate 24 from continuing to pass pulses from the NAND gate 22 because the OR gate 24 is continuously "on".

It is important to disable the up count operation when the counter is full because digital counters generally count "around" to zero after they are filled. This would result in an unintentional indication of a completely discharged battery, when the battery is actually fully charged.

A similar control circuit is available in the completely discharged situation through the operation of a chain of NOR gates 72, 74, and 76 which provide a logic 1 on connection 78 to disable the OR gate 36 when the counter is counted down to all zeros in the upper digit positions illustrated in the drawing.

As the completely discharged condition is approached, when logic zeros first appear on the three highest order outputs 58, 60, and 62, those signals, carried to the NOR gate 72, cause that NOR gate to issue a logic 1 output to a connection 80 which energizes an alarm lamp 82. Lamp 82 warns the operator that the battery is almost depleted. It will be understood that the alarm lamp 82 may be equipped with a flasher to get the operator's attention, or an audible alarm may be used in place of the alarm lamp. The logic 1 output at connection 80 is inverted by an inverter 84, and when the process of depletion of the battery proceeds far enough that the counter output 64 is also logic zero, the resultant two logic zero inputs to the NOR gate 74 results in a logic 1 output at connection 86. The logic 1 output at 86 is supplied to a load lockout circuit including a transistor 88 and a relay including a winding 90 and a normally open contact 92. When the transistor is thus energized, the winding 90 is energized, and the contact 92 is closed. Contact 92 may be connected to a relay (not shown) having a normally closed contact in series with an auxiliary load. When contact 92 is closed, the relay picks up to disable that load and to save battery current, and to encourage the operator to obtain a recharge of the battery 10. If the control apparatus is a forklift truck, the load lockout relay contact 92 will normally be connected to disable the lift motor of the forklift.

The logic 1 signal at connection 86 is inverted by the inverter 94, and when the discharge of the battery proceeds to the extreme condition where a logic zero is available on connection 66, the resultant combination of logic 0 inputs to NOR gate 76 results in the logic 1 output at connection 78 which disables OR gate 36.

As an alternative feature of the FIG. 1 embodiment of the invention, an oscillator voltage function generator 96 may be provided which receives the feedback voltage at connection 48A and generates a control voltage as a function of that feedback voltage to control the oscillator 54 at connection 98. Oscillator 54 need not ordinarily be a voltage controlled oscillator. However, with the alternative feature of the function generator 96, the oscillator 54 is a voltage controlled oscillator, the frequency of which varies according to the control voltage from function generator 96. It is generally desired, in such a modification, that the oscillator 54 should oscillate at a lower frequency as the state of charge increases, and should oscillate at a higher frequency as the state of charge decreases. Accordingly, the oscillator voltage function generator 96 preferably inverts the feedback voltage, providing an inverted function of the feedback voltage at connection 98 in order to slow down the oscillator 54 as the feedback voltage increases. Furthermore, the oscillator voltage function generator 96 may very well generate a nonlinear function of the feedback voltage to better match the operation of the monitoring circuit to the actual discharge and charge characteristics of the battery.

The alternative feature with the oscillator voltage function generator 96 and a variable frequency oscillator 54 is very useful in helping to match the monitoring system to the actual battery charge and discharge characteristics. Thus, the terminal voltage tends to level off at the end of the charge characteristic and tends to drop at a steeper rate at the end of the discharge characteristic. This is apparent from the curves 100 and 110 of FIG. 2 which are explained below.

However, the major matching of those characteristics is accomplished by means of the charge function generator 18 and the discharge function generator 30 as will be described below in conjunction with FIG. 2.

In another alternative feature of the invention with respect to the operation of the oscillator 54, the oscillator 54 may be controlled to operate at different frequencies dependent on whether the system is in the charge mode or in the discharge mode. Typically, charging occurs at a relatively low rate compared to discharge. Accordingly, it is advantageous to have the oscillator 54 operate at a lower frequency during charge, and at a higher frequency during discharge to thereby achieve different rates of correction of the count in counter 16. In accordance with this alternative feature, connections 99 and 101 are provided from the outputs of the respective amplifiers 20 and 32 in the charge and discharge signal channels. These outputs are both connected to the oscilaltor voltage function generator 96. When this feature is provided, the connection 99 provides a signal from the charge function channel to the oscillator voltage function generator 96 to cause the voltage function generator to supply a control voltage to the oscillator 54 to run the oscillator 54 at a relatively low frequency. On the other hand, when the system is in the discharge mode, the resultant output from amplifier 32 is supplied through connection 101 to the oscillator voltage function generator 96 to cause the oscillator to run at a relatively higher frequency. By this additional control means, the system operates to correct the count stored in the counter 16 at relative rates which are higher for discharge than for charge.

It will be understood that the feature last described, in which the oscillator 54 frequency is changed by signals from connections 99 and 101, can be impelmented without having the oscillator voltage function generator 96 controlled also by the feedback voltage from feedback connection 48A. Furthermore, separate oscillators may alternatively be employed in place of the single oscillator 54, the separate oscillators being individually enabled by the signals on connections 99 and 101. In such an arrangement, of course, the gates 22 and 34 may be respectively arranged to simply gate different oscillators operating at different frequencies into the respective charge function and discharge function channels.

Figure 2:
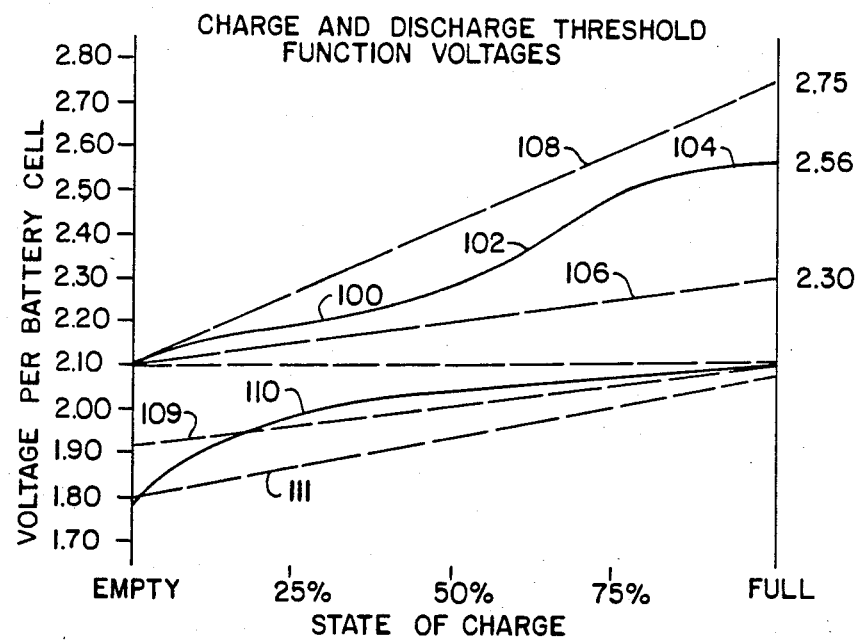
FIG. 2 is a curve sheet illustrating charge and discharge functions which are typically generated by charge and discharge function generators in accordance with the present invention to act as threshold functions for operation of the system.

FIG. 2 is a curve sheet illustrating charge and discharge functions which are typically generated by charge and discharge function generators in accordance with the present invention to act as threshold functions for operation of the system.

In this figure, the vertical ordinate scale is in terms of voltage per battery cell. This is appropriate since it is a universally applicable scale, no matter how many battery cells are included in a particular battery. The abscissa represents battery state of charge.

The curve 100 represents a typical charge terminal voltage curve for a normal charging rate in a lead acid battery. As shown in the drawing, this curve begins with a fairly constant slope upwardly from a voltage level of 2.1 volts per cell, and then moves into a steeper slope portion at 102, and finally tapers off to a low slope portion at 104. An advancing level of terminal voltage which is at or near the curve 100 is required in order to achieve any meaningful battery charging effect as the level of charge increases. Accordingly, the charge threshold function voltage should ideally more or less match the slope and shape of curve 100, or perhaps be positioned somewhat below that curve in order to detect effective occurrences of battery charging.

In the embodiment of FIG. 1, the charge function generator 18 may preferably have the capability for providing a charge threshold function voltage characteristics which is adjustable in slope between the curve 105, which ends at a terminal voltage of 2.3, and curve 108, which ends at a terminal voltage of 2.75. The adjustability of this threshold function voltage characteristic permits the adaptation of the apparatus to different conditions of operation. For instance, if it is found, through experience, that when the system is adjusted for curve 106 a registration of full charge is achieved by the monitoring system before actual full charge is achieved, then the slope of the threshold curve 106 is adjusted upwardly, to more closely approach the curve 100, so that fewer upward terminal voltage excursions will be recognized as effective in adding to the charge of the battery.

The condition at which the battery is fully discharged is a matter of judgment. For the purposes of the present discussion, it is assumed that the battery is fully discharged if the terminal voltage during a slow discharge operation achieves a value in the order of 1.8 volts per cell. Under these circumstances, effective charging will begin when the battery terminal voltage is raised by the charger, or by dynamic braking, or otherwise, to a level in the vicinity of 2.1 volts per cell, or higher.

The typical lead acid battery terminal voltage discharge characteristic is shown by curve 110. It will be understood, in reading FIG. 2, that, during discharge, the movement is from the right of the drawing at the full indicator toward the left of the drawing on curve 110 towards the empty indicator.

The discharge threshold function voltage characteristic, as provided by the discharge function generator 30 will typically have a uniform slope, as indicated by the dotted line 111, and that slope may be adjustable to a lower slope at a higher level, more closely approximating that of curve 110, as indicated at 109. This may be described as a combined "rotate" and "translate" adjustment. Again, the slope of the threshold function voltage characteristic may be adjusted depending on practical experience in order to achieve the appropriate indication of battery state of charge for the particular conditions encountered.

Figure 2A:
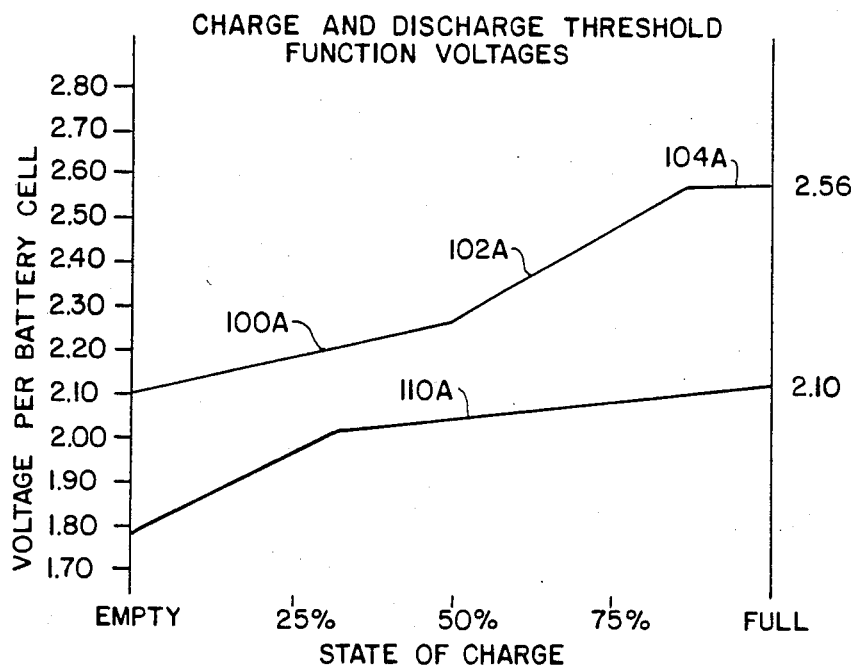
FIG. 2A is a curve sheet illustrating alternative charge and discharge functions which may be generated by charge and discharge function generators in accordance with the present invention to act as threshold functions for operation of the system.

If desired, the charge function generator can be designed to produce a charge threshold function voltage characteristic which more accurately approximates the curve 100. Such a characteristic is shown at 100A in FIG. 2A. Similarly, the discharge function generator 30 may be designed to have variable slope values at different portions of the characteristic in order to more closely approximate the curve 110. Such a characteristic is shown at 110A in FIG. 2A. For ease of synthesis, the characteristics shown at 100A and 110A are made up of constant slope segments. Thus, such characteristics have different shapes at different battery charge states.

It is a very important feature of the invention, as illustrated in FIG. 2, that no matter how the slopes of the threshold voltage characteristics are adjusted, the charge threshold function characteristic is always substantially separated from the discharge threshold function voltage characteristic so that there is a considerable band of terminal voltages which are possible, at any state of charge, which are not recognized as signifying battery charge or battery discharge. Furthermore, these characteristics never cross one another. There is always a substantial gap between them, and the charge signals are not effective until terminal voltage achieves a value above the charge threshold function voltage characteristic curve. Similarly, the discharge signals are not effective until the battery terminal voltage achieves a value below the discharge threshold function voltage characteristic. Accordingly, there is an automatic recognition by the battery monitoring system as to whether the apparatus which is being monitored is in a charge mode or a discharge mode. This too is an important unique feature of the invention.

Figure 3:
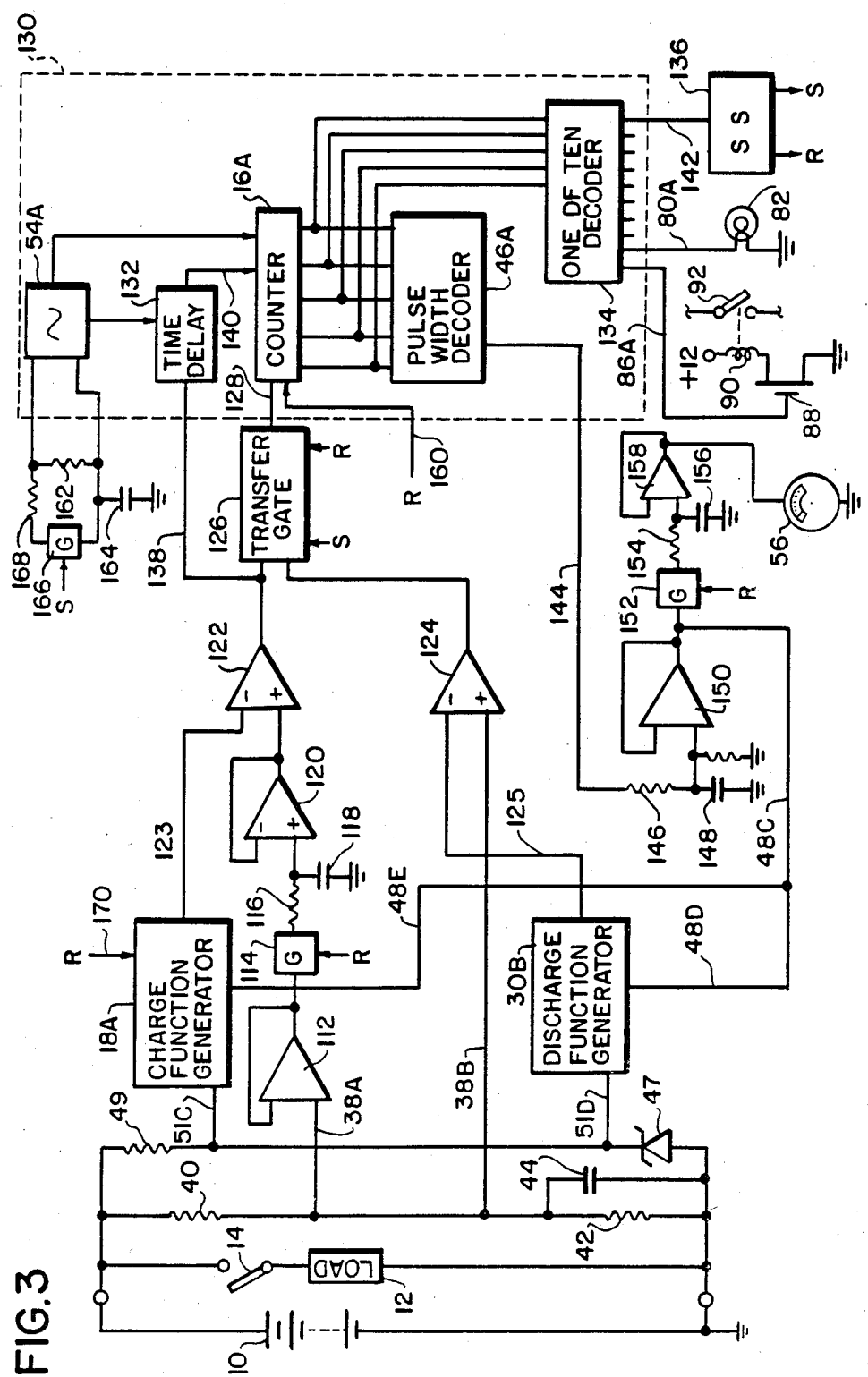
FIG. 3 is a schematic circuit diagram illustrating a second preferred embodiment of the invention.

FIG. 3 is a schematic circuit diagram of an alternative embodiment of the invention. In this embodiment, the battery which is to be monitored is again shown at 10 with the load 12 controlled by a switch 14. The control for the load 12 may be substantially more elaborate than the simple switch 14. The monitoring system output devices are similar to those in FIG. 1, and may include a voltmeter 56 for providing a visual indication of charge status, as well as an alarm lamp 82 for providing an alarm when the battery charge is almost completely depleted, and a load lockout circuit including the transistor 88 controlling a relay 90 having a relay contact 92.

In this embodiment, a fraction of the battery voltage is again detected by the monitoring circuit as determined by a voltage divider including resistors 40 and 42. Also, the input is filtered by a low pass filter including resistor 40 and capacitor 44.

The charge signal channel in this embodiment includes a charge function generator 18A, an amplifier 112, a gate 114, a track-and-hold circuit including a resistor 116, a capacitor 118, and an amplifier 120, and a compare amplifier 122. The operation of the charge signal channel is described more fully below.

The discharge signal channel includes a discharge function generator 30B and a compare amplifier 124 which receives and compares the battery terminal voltage signal on connection 38B with the signal from the discharge function generator. The operation of the discharge signal channel is very similar to the operation of the discharge signal channel in the embodiment of FIG. 1. Thus, if the battery terminal voltage goes below a threshold value determined by the discharge function generator 30B, the resultant signal from compare amplifier 124 is effective through a transfer gate 126 and a connection 128 to change the count in counter 16A to indicate a reduced battery charge state.

In the embodiment of FIG. 3, the counter 16A may preferably comprise a part of an integrated circuit 130 which is shown in the drawing as enclosed within a dotted box. The integrated circuit 130 may be very similar to the integrated circuit disclosed and described in great detail in connection with FIG. 3 of the drawings of the above-mentioned U.S. patent (U.S. Pat. No. 4,560,937). Only the components of that integrated circuit which are essential to the explanation of the present invention are shown and described here. They include an oscillator 54A, a time delay device 132, a pulse width decoder 46A, which operates to provide a duty cycle digital-to-analog conversion, and a one of ten decoder 134, in addition to the counter 16A. The integrated circuit 130 was previously used in a unidirectional battery state-of-charge monitor circuit. The present embodiment of FIG. 3 enables this integrated circuit to be operated to provide a bidirectional result. The operation on the discharge side is similar to the operation obtained in the prior patent (U.S. Pat. No. 4,560,930), and similar to the operation on the discharge side in the embodiment of FIG. 1. However, the operation on the charge side is unusual, and is described more fully below.

In the embodiment of FIG. 3, the counter 16A preferably counts up as the battery charge is depleted, because that is the way that the integrated circuit is designed to operate. However, it will be appreciated that the system could be designed to employ a counter operating in either direction to indicate battery charge depletion.

The transfer gate 126 is operable under all conditions except charge adjustment cycle conditions to transmit signals from the discharge compare amplifier 124 to the input connection 128 of counter 16A. However, under charge adjustment cycle conditions, the transfer gate is shifted to instead accept signals from compare amplifier 122. The shift in the status of transfer gate 126 is controlled by inputs respectively marked "S" and "R". These inputs are received from the "S" and "R" outputs of a monostable multivibrator circuit 136, sometimes referred to as a "single shot", which is illustrated in the lower right-hand corner of the drawing. The conditions for actuation of the single shot 136 and the initiation of the charge adjustment cycle are described below.

As previously mentioned above, the pulse width decoder 46A provides the function of a duty cycle digital-to-analog convertor. The pulses, the proportional widths of which are modulated according to the count stored in counter 16A, are connected through a connection 144 and a filter including resistor 146 and capacitor 148 to an amplifier 150. The filter 146–148 serves as a smoothing filter to derive a substantially constant dc level determined by the proportional widths of the pulses from pulse width decoder 46A. The reference to "proportional" pulse widths is intended to refer to the proportion of "on" time to "off" time. The proportion can be changed by changing the "on" pulse width, or by changing the frequency of the pulses, or by changing both. This is sometimes referred to as a "duty-cycle" digital-to-analog converter.

The resultant output from amplifier 150 provides a feedback voltage on connection 48C which is supplied to the discharge function generator 30B at connection 48D, and to the charge function generator 18A at connection 48E. This analog output voltage from amplifier 150, which indicates the charge level of the battery as indicated by the count stored in counter 16A, is also carried through a gate 152, a filter including resistor 154 and capacitor 156, and amplifier 158 to a voltmeter 56 for providing a visual indication of state of charge.

The charge function generator 18A receives a state-of-charge feedback signal through connections 48C and 48E, and generates a charge function threshold voltage as a function of the feedback signal. If that threshold voltage is exceeded by the battery terminal voltage as detected at connection 38A through amplifier 112 and the intervening components, and compare in compare amplifier 122, a resultant high voltage signal appears on connection 138 to a time delay circuit 132. Time delay circuit 132 is preferably a digital counter which responds to pulses from the oscillator 54A. If the high voltage (indicating that the battery is being charged) persists for a time sufficient for the time delay circuit 132 to time out, a signal is sent on connection 140 to the reset input of counter 16A, resetting that counter to all zeros, corresponding to a full battery charge. This is not a correct indication, but it is an intermediate result which commences the charge adjustment cycle sequence of events leading to an ultimate moderate upward readjustment of the counter to indicate an enhanced charge condition. The input connection 138 to the time delay circuit 132 is referred to in the prior patent (U.S. Pat. No. 4,560,937) as a high voltage reset input. The signal at connection 138 may simply enable the time delay circuit 132 so that it may count up. If that signal disappears, then the time delay counter is disabled and reset, waiting for another high voltage condition to occur.

The previously described reset of the main counter 16A results in an output from the one of ten decoder 134 on connection 142 to the single shot circuit 136. The one-of-ten decoder is designed to drive a series of ten lamps, such as LEDs, to provide a visual indication of charge state. The output on 142 is then intended to indicate a full charge condition. When energized at 142, the single shot circuit 136 is "set", and issues a logic 1 signal on the "S" output and a logic 0 on the "R" output. This is a reversal of the signals normally emitted by the single shot when it is reset. This reversal of signals causes the transfer gate 126 to reverse in operation, transmitting signals from the charge signal channel compare amplifier 122 to the counter 16A, instead of from the discharge signal channel including compare amplifier 124. At the same time, the resetting of the main counter 16A has caused the pulse width decoder 46A to emit full charge signals on connection 144 to the smoothing filter 146-148 and the amplifier 150. Thus, the feedback signal on connections 48C and 48E to the charge function generator indicates a full charge, with the result that the charge function generator issues an altered charge functional threshold voltage. However, the voltage actually achieved on the battery terminals is usually below a full charge voltage. Accordingly, the compare amplifier 122 now provides signals through the transfer gate 126 to the counter 16A which cause the counter to count up, indicating a reduced charge. This counting up of the counter 16A continues until the feedback through the pulse width decoder 46A, the filter 146-148, and the feedback connections 48C-48E causes the charge function generator to reduce the charge function threshold voltage output to a point corresponding to the achieved battery terminal voltage. This all occurs during the fixed time interval determined by the single shot circuit 136.

In order to ensure that the readjustment of the counter 16A during the charge adjustment cycle occurs within the brief time interval provided by the single shot (preferably only about five seconds), the counter 16A is preferable caused to go into a fast count mode by means of an input of the "R" signal from single shot 136 at connection 160. This input 160 is referred to as a "test" input in the prior U.S. patent (U.S. Pat. No. 4,560,937). To further increase the speed of operation of the counter under these circumstances, the frequency of the oscillator 54A is preferably increased. The frequency of the oscillator is normally controlled by the circuit constants of a resistor 162 and a capacitor 164. However, when the single shot 136 is set, the resultant "S" input on an associated gate 166 closes that gate to insert an auxiliary resistor 168 in parallel with resistor 162 to increase the oscillator 54A frequency.

In the immediate circuit supplying meter 56, the gate 152 is preferably opened by removal of an "R" input from the single shot circuit 136 so that the resetting of the counter 16A to a full charge indication, and the subsequent count down of the counter 16A will not be accompanied by fluctuations of the needle of the meter 56. The opening of the gate 152 occurs so quickly after the setting of the counter 16A to the "full" condition in the charge adjustment cycle that the pulse width decoder 46A digital-to-analog convertor will not have had time to operate, particularly because of the inherent time delays of the filtering elements 146-148 and 154-156. During the interval of the opening of the gate 152, the capacitor 156 holds the voltage on the input of amplifier 158, and therefore holds the prior reading on the meter 56. As soon as the single shot circuit 136 times out, the gate 152 is again closed, and the new value stored in counter 16A is decoded and registered on the meter 56.

In order to assure that the charge adjustment cycle can be completed, without interference from new voltage measurements of the battery terminal voltage which occur during the charge adjustment cycle, the terminal voltage which was measure at the beginning of the charge adjustment cycle is preferably held by capacitor 118 at the input of amplifier 120. Capacitor 118 is isolated from the associated input circuit during the charge adjustment cycle by the opening of gate 114 as the "R" signal is removed by the single shot 136.

The drawing also shows an "R" input to the charge function generator 18A. This represents a preferred feature in which the "R" input causes the opening of a gate within the charge function generator upon the actuation of the single shot circuit 136 which shifts the feedback signal supplied on connection 48E to the charge function generator 18A downwardly by about four percent of its range. The result is that in the counting of the counter 16A, the count proceeds to a level indicating a charge four percent higher than would have been indicated by the value of the voltage signal held by the capacitor 118. Accordingly, when the single shot circuit 136 times out, and the "R" signal again becomes available, the feedback voltage available at 48E to the charge function generator 18A is switched so as to provide a permanently higher value for the threshold voltage available from the charge function generator. This prevents the system from recycling into additional charge adjustment cycles because of the continued maintenance of the same higher battery terminal voltage which triggered the first charge adjustment cycle.

Figure 4:
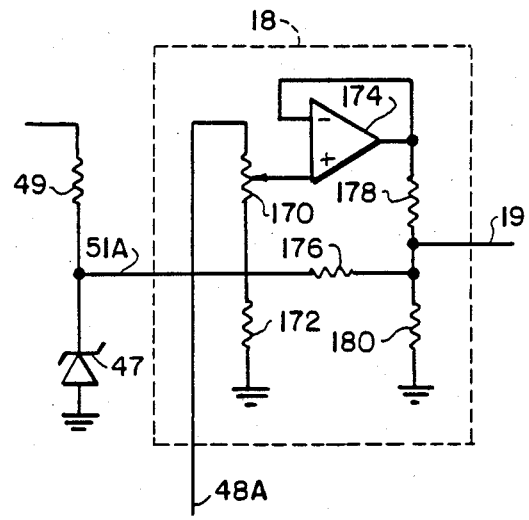
FIG. 4 illustrates one preferred embodiment of a charge function generator which may be utilized in the system embodiment of FIG. 1.

FIG. 4 illustrates one preferred embodiment of a charge function generator 18 which may be utilized in the system embodiment of FIG. 1. The feedback voltage on connection 48A is shown to be supplied within the function generator 18 to a potentiometer 170 and a voltage divider resistor 172 connected to ground. The portion of the feedback voltage selected by the adjustment of potentiometer 170 is supplied to the noninverting input of a follower amplifier 174, and through that amplifier to a voltage combining network including resistors 178, 180, and 176. Resistor 176 is connected through connection 51A to the constant voltage source including zener diode 47 and resistor 49, which were also shown in FIG. 1. The various resistors in the resistor adding network 176, 178, and 180 are selected to provide an output threshold voltage characteristic at output connection 19 which corresponds to curve 106 in FIG. 2, or curve 108 in FIG. 2, or a curve having some slope between those two curves, as determined by the adjustment of potentiometer 170.

Figure 5:
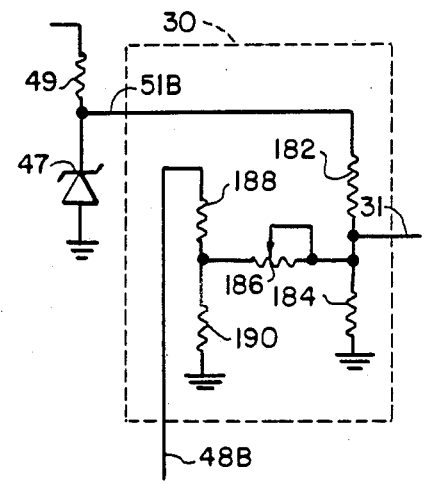
FIG. 5 illustrates one preferred embodiment of a discharge function generator which may be utilized in the system of FIG. 1.

FIG. 5 illustrates one preferred embodiment of the discharge function generator 30 which may be utilized in the system of FIG. 1. Again in FIG. 5, the constant voltage circuit including zener diode 47 and the dropping resistor 49 are shown. That circuit provides a constant voltage on connection 51B to a voltage adding network including resistors 182, 184, and a variable resistor 186. The state-of-charge feedback voltage from connection 48B is connected to a voltage divider consisting of resistors 188 and 190. This entire resistor network 182-190 is effective to generate a discharge threshold voltage characteristic output at 31 such as illustrated in FIG. 2 at curves 109 or 111. The variable resistor 186 provides a combined adjustment of slope and voltage level in the characteristic, as illustrated by a comparison of the curves 109 and 111.

Figure 6:
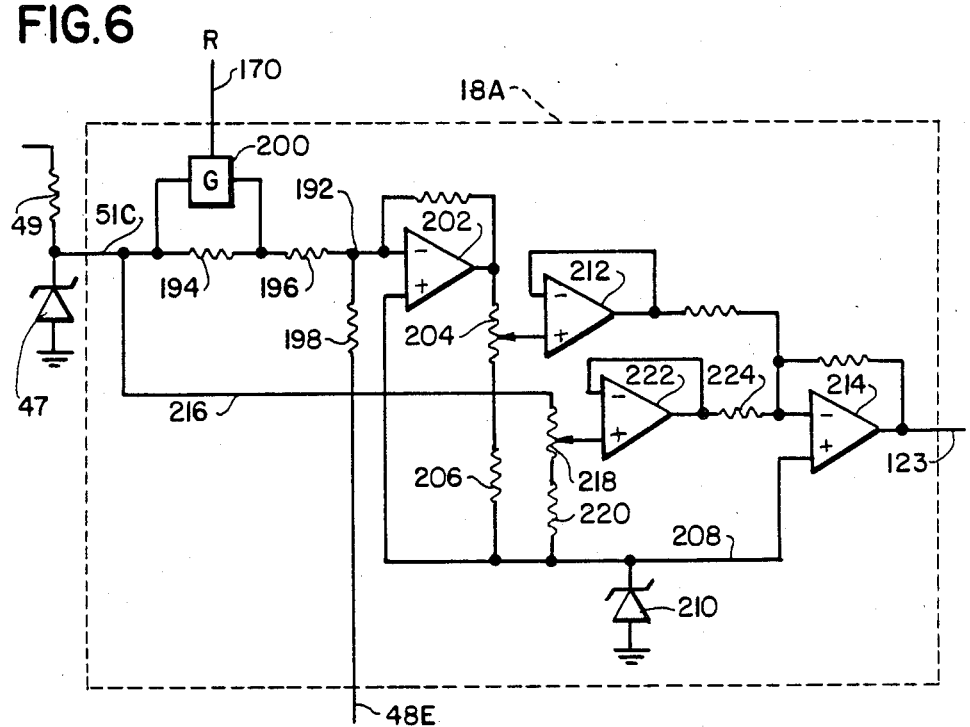
FIG. 6 illustrates one preferred embodiment of a charge function generator which may be utilized in the system of FIG. 3.

FIG. 6 illustrates one preferred embodiment of a charge function generator 18A which may be employed in the monitor system of FIG. 3. For clarity, the constant voltage zener diode 47 and the associated dropping resistor 49 are shown from FIG. 3. They provide the constant voltage at connection 51C to the function generator 18A. The state-of-charge feedback voltage is supplied at connection 48E. The constant voltage and the feedback voltage are carried to a common node 192 by resistors 194, 196, and 198. Except during the charge adjustment cycle, a signal "R" is available on connection 170 to a gate 200 which shorts out the resistor 194.

The combination of the constant voltage signal and the feedback voltage signal at node 192 is amplified in an amplifier 202, and the resultant output voltage is supplied to a voltage divider consisting of a potentiometer 204 and a resistor 206 connected to a common bus 208, which is maintained at a constant voltage by a back biased zener diode 210.

The portion of the potentiometer 204 voltage selected by the adjustment of the potentiometer is amplified by a follower amplifier 212 and supplied as one input to an output amplifier 214. The adjustment of the potentiometer 204 determines the slope of the charge function voltage characteristic generated by the circuit. An adjustable component of the fixed voltage from input 51C is also added into the threshold voltage characteristic by means of a connection 216, a potentiometer 218, and a voltage dropping resistor 220. The fraction of the fixed input voltage as selected and determined by the setting of potentiometer 218 is amplified by a follower amplifier 222 and supplied through a resistor 224 to the inverting input of output amplifier 214. The adjustment of potentiometer 218 determines the absolute level of the discharge function voltage threshold characteristic determined by the circuit 18A. Thus, in this circuit, the slope and the level of the threshold characteristic are separately adjustable respectively by the adjustments of the potentiometers 204 and 218.

When the system of FIG. 3 goes into the charge adjustment cycle, the signal "R" is removed from connection 170, opening gate 200 in FIG. 6, and making resistance 194 effective in the circuit. This slightly reduces the constant voltage signal at node 192, which makes the feedback voltage from feedback connection 48E a more dominant factor at node 192, thus causing the output signal from the charge function generator 18A at 123 to be shifted upwardly by about four percent of its range. This prevents the system from recycling in the charge adjustment cycle mode as previously explained above in connection with the operation of FIG. 3.

Figure 7:
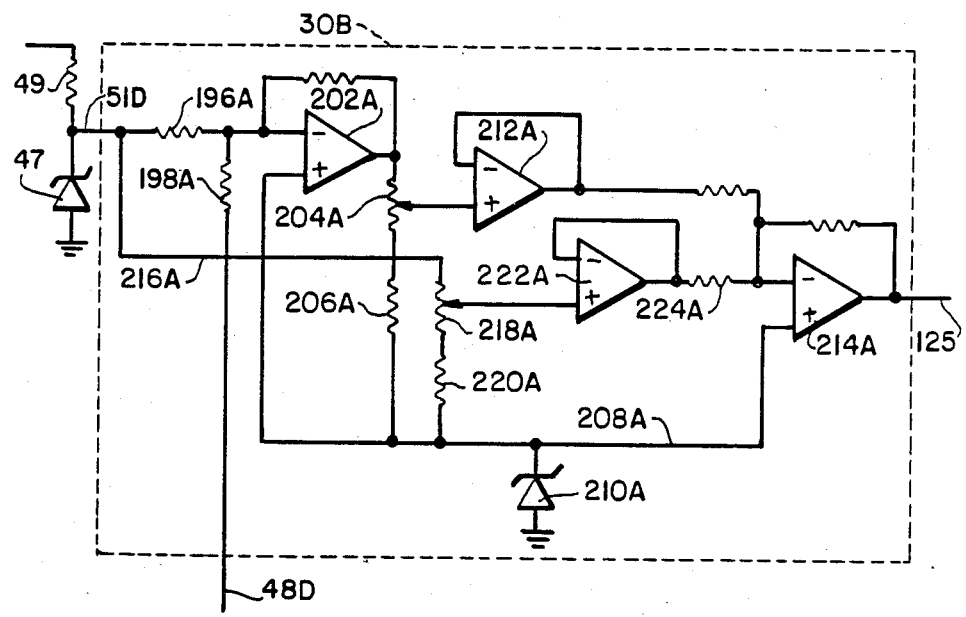
FIG. 7 illustrates one preferred embodiment of a discharge function generator which may be utilized in the system of FIG. 3.

FIG. 7 illustrates a preferred embodiment of the discharge function generator 30B of FIG. 3. The circuit configuration of the discharge function generator 30B is virtually identical to that of the charge function generator 18A of FIG. 6, except that some circuit components preferably have different circuit constant values. The operation of the discharge function generator is essentially the same as the operation of the charge function generator of FIG. 6. The corresponding circuit components are given corresponding numbers in FIG. 7, but with the suffix letter A added. The charge function generator of FIG. 6 and the discharge function generator of FIG. 7 may share certain components such as the constant low voltage lead 51C, the resistors 194, 196, and 198, the feedback lead 48E, and the amplifier 202. The zener diode 210 may also be shared.

The resistor 194 and the gate 200 are not shown in FIG. 7 because the gate 200 is never opened when the system is in the discharge mode so that resistor 194 is always shorted out of the discharge function generator circuit 30B when the threshold set by that circuit is operative.

Figure 8:
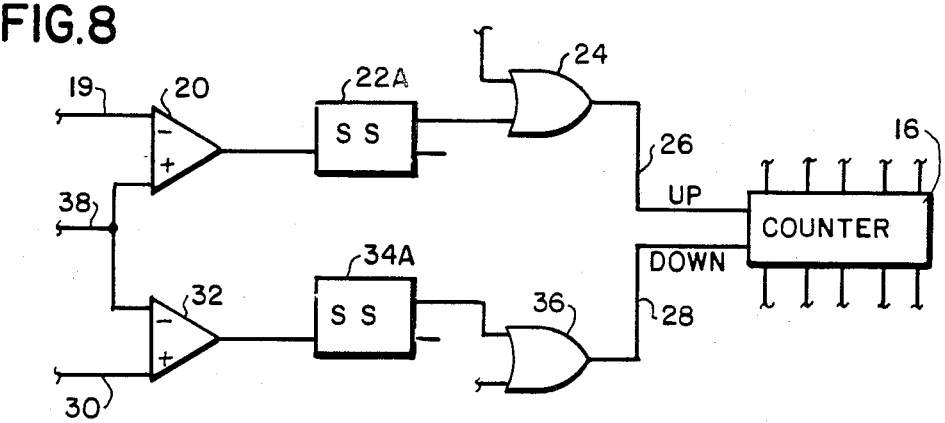
FIG. 8 is a partial schematic circuit diagram of a modification of the system of FIG. 1 which does not employ an oscillator.

FIG. 8 is a partial view of a modification of the system of FIG. 1. In the modification of FIG. 8, the compare amplifiers 20 and 32 of FIG. 1 are shown again, as are the counter 16 and the gates 24 and 36. In place of the oscillator 54 and the gates 22 and 34 which gate oscillator pulses into the respective charge and discharge channels, the system of FIG. 8 provides single shot circuits 22A and 34A in the respective charge and discharge channels. In the modification of FIG. 8, as a consequence of the insertion of the single shot circuits 22A and 34A in place of the oscillator and gates, a single pulse is provided in each signal channel for each incident when the threshold in that channel is exceeded. While this does not provide any time integration indicative of how long the condition beyond the threshold persists, as does the FIG. 1 embodiment, it does often provide sufficient information for altering the count stored in the counter 16 in order to achieve an accurate indication of charge condition. Furthermore, the system of FIG. 8 is somewhat simpler, since it does not require an oscillator.

Figure 9:
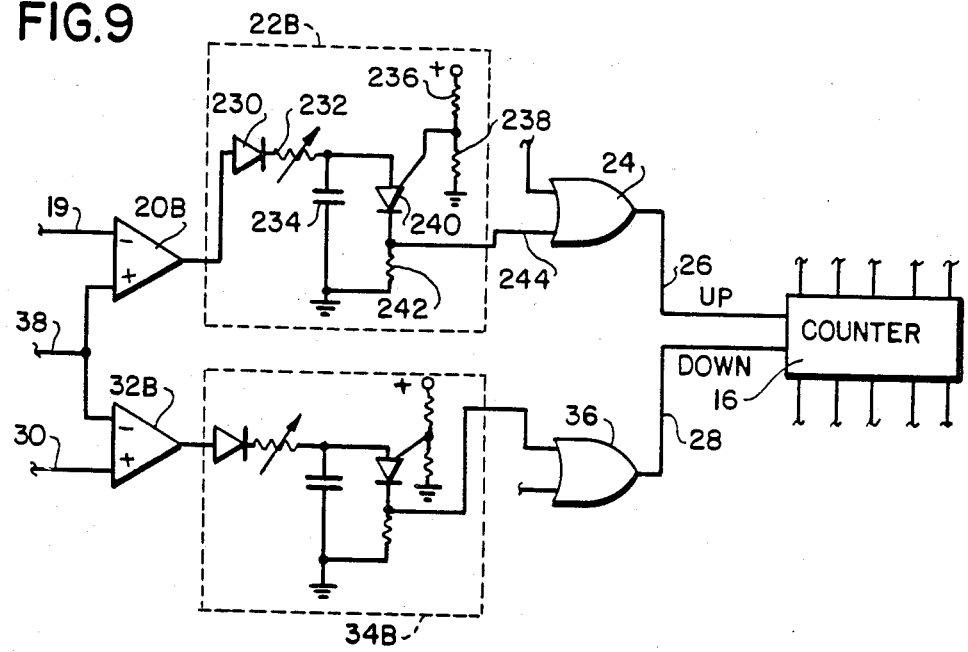
FIG. 9 is a partial schematic circuit diagram illustrating another modification of the system of FIG. 1 employing self-resetting integrator circuits.

FIG. 9 is a partial view of still another modification of the system of FIG. 1 which is similar to the modification of FIG. 8, except that the single shot circuits 22A and 34A have been replaced with self-resetting integrator circuits 22B and 34B and the compare amplifiers 20 and 32 have been relaced with fixed-gain differential amplifiers 20B and 32B. The gain setting components are not shown. Referring to circuit 22B, when the output from the differential amplifier circuit 20B indicates that the battery terminal voltage is beyond the threshold, the output from the differential amplifier 20B is supplied through a diode 230 and a variable resistor 232 to charge a capacitor 234. When the capacitor charge reaches a sufficient value, as determined by a bias voltage from a voltage divider 236–238, a unijunction transistor 240 becomes conductive, discharging capacitor 234 to reset the integrator, and providing an output signal across a resistor 242 on connection 244 to the gate 24. This signal constitutes a pulse which is counted by the counter 16.

If the voltage excursion of the input voltage beyond the threshold is interrupted, the diode 230 prevents the capacitor 234 from being discharged. Thus, the capacitor 234 integrates and remembers multiple excursions of the input voltage beyond the threshold, until there is a sufficient charge to trigger conduction in the unijunction transistor 240 to produce an output pulse to be counted. Adjustment of the variable resistor 232 permits adjustment of the rate of integration.

One important advantage of this modification is that the integrator circuit 22B not only provides a time integration of the input signal but also an amplitude integration. Accordingly, because of the amplitude integration, it represents a refinement of the system of FIG. 1.

The resesttable integrator 34B is identical to the resettable integrator 22B and operates exactly the same in the discharge signal channel. The only difference is that actuation occurs in response to an excursion of the input voltage beyond the discharge threshold function voltage.

Figure 10:
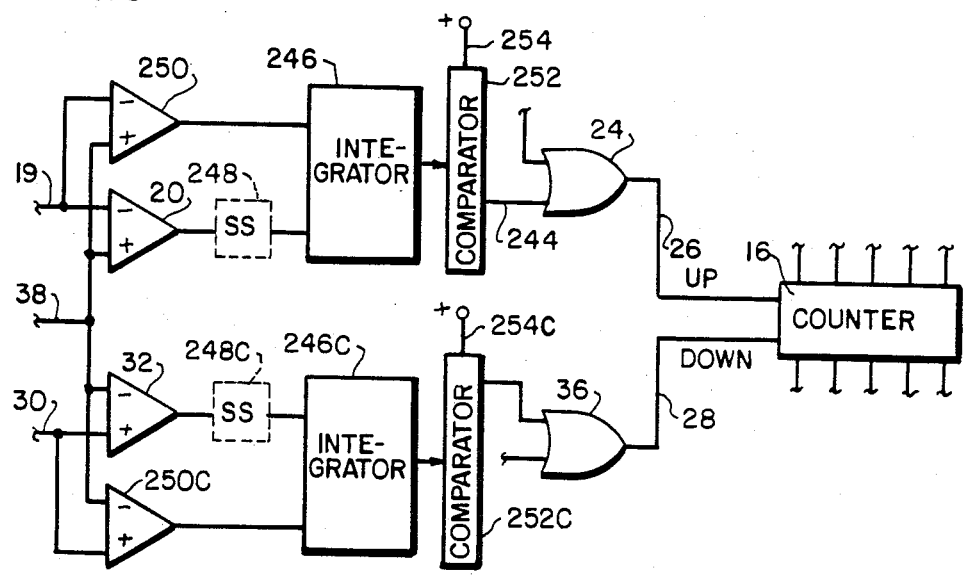
FIG. 10 is a partial schematic circuit diagram illustrating still another modification of the system of FIG. 1 which is similar to the embodiment of FIG. 9, and which illustrates two alternative resetting integrator arrangements.

FIG. 10 is still another partial schematic diagram illustrating another modification of the system of FIG. 1. In the system of FIG. 10, in the charge channel, there is provided an integrator 246 which is enabled by a signal from the comparator amplifier 20 transmitted through an optional single shot circuit 248. When the single shot circuit 248 is not provided, a direct connection is provided from the output of compare amplifier 20 to the enable input of integrator 246. The system is first described without the single shot 248. A differential amplifier 250 is connected to detect and amplify the difference between the battery voltage on connection 38 and the charge functional threshold voltage on connection 19. It is the output of this differential amplifier 250 which is connected for integration by the integrator 246 when that integrator is enabled by compare amplifier 20. The voltage accumulated in the integrator 246 is applied to a comparator 252, which is preferably connected to a reference voltage source, as indicated at 254. When the voltage of integrator 246 exceeds the voltage reference of the comparator 252, the comparator 252 switches into a different state, providing an output pulse on connection 244 to be counted in the counter 16. The comparator change of state preferably reset the integrator 246 in a manner similar to that described for the integrator 22B of FIG. 9.

However, an important difference between the embodiment of FIG. 9 and the embodiment of FIG. 10 is that if the battery terminal voltage signal does not continue beyond the threshold long enough to result in an output pulse to the counter 16, the compare circuit 20 removes the "enable" signal and resets the integrator 246. Thus, the integrator 246 of FIG. 10 does not store and retain information about prior occurrences of excursions beyond the threshold.

Substantially identical circuitry is provided for the discharge signal channel, corresponding elements being identified by the same numbers with added suffix letters C. The operation of the components just described for the charge signal channel is identical in the discharge signal channel.

The single shot circuits 248 and 248C, when included in the system of FIG. 10, enable the associated integrator only for a limited interval corresponding to the time interval during which the single shot output is on. As a result, on output pulse is produced by the integrator and counted in the counter 16 only when the battery terminal voltage goes beyond the reference voltage by an amplitude sufficiently great to integrate up to the comparator 252 voltage level during the limited time interval determined by the "on" interval of the single shot. This is a means of refining the operation of the system to respond only to voltage excusions of substantial amplitude duration beyond the threshold.

In each of the modifications of FIGS. 8, 9, and 10, the circuit arrangements in the charge signal channel and the discharge signal channel have been presented as substantially identical. However, it will be understood that the arrangements in these respective channels can be mixed. That is, the arrangement of FIG. 8 may be employed in the charge signal channel and the arrangement of FIG. 9 may be employed in the discharge signal channel. Similarly, any one of the arrangements for any one channel illustrated in FIGS. 1, 8, 9, or 10 may be used with any other one of the arrangements shown in any of these four figures for the other channel.

The structure of the digital-to-analog convertor 46 in FIG. 1 has not been specified. However, a resistor network convertor may be employed, or the pulse width decoder convertor 46A of FIG. 3 may be employed. Either of the embodiments may employ other digital-to-analog convertors.

While the discussion of the various systems and modifications of FIGS. 1, 3, 8, 9, and 10 have generally been in terms of an upward charge status correction in response to a charging event and a downward charge status correction in response to a discharge event, it will be understood that, under some circumstances, there may be an upward correction without an actual charging event. Such a correction may be due entirely to the natural voltage recovery of the battery when it is not loaded. However, the vertical separation of the charge and discharge threshold voltage characteristics, as discussed in connection with FIG. 2, generally prevent upward correction without a true "charging" event.

A downward charge status correction can occur in the absence of a discrete discharging event in response to the reduction in battery terminal voltage accompanying the gradual self discharge of the battery over an extended period. However, during normal operation, it is anticipated that most downward adjustments in charge status will be the result of discrete discharging events accompanied by downward terminal voltage excursions.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A bidirectional battery state-of-charge monitor comprising a circuit including an integrator for storing a state-of-charge measurement; and a charge signal channel and a separate discharge signal channel both connected to said integrator and both arranged for connection to receive a battery terminal voltage signal, said charge signal channel including comparison means operable in response to a battery terminal voltage signal above a charge threshold function voltage to produce a charge output signal to change the integrated measurement in the integrator in a first direction to indicate an increased charge, the discharge signal channel including comparison means operable in response to a battery terminal voltage signal below a discharge threshold function voltage to produce a discharge output signal to change the integrated measurement in the integrator in a second direction to indicate a decreased charge, both said charge and discharge threshold function voltages being functions of the stored integrator state-of-charge measurement.

2. A battery state-of-charge monitor comprising an integrator for storing a state-of-charge measurement, a charge signal channel arranged for connection to receive a battery terminal voltage signal and connected to said integrator and operable in response to a battery terminal voltage signal in the charge range above a charge threshold function voltage which is a function of the integrator measurement to produce a charge output signal to change the integrated measurement in a first direction to indicate an increased charge, a discharge signal channel arranged for connection to receive a battery terminal voltage signal and connected to said integrator and operable in response to a battery terminal voltage signal in a discharge range below a discharge threshold function voltage which is a function of the integrator measurement to produce a discharge output signal to change the integrated measurement in a second direction to indicate a decreased charge, output means connected to said integrator for indicating the achieved integration value, a charge threshold function generator comprising a part of said charge signal channel and connected to receive a feedback signal from said output means, said charge threshold function generator being operable to generate said charge threshold function voltage as a function of said feedback signal from said output means, a discharge threshold function generator comprising a part of said discharge signal channel and connected to receive a feedback signal from said output means, said discharge threshold function generator being operable to generate said discharge threshold function voltage as a function of feedback signal from said output means, said charge and discharge function generators being operable to generate functions which are separated, with the charge function always being higher than the discharge function.

3. A monitor as claimed in claim 2 wherein said charge signal channel includes a voltage comparison circuit connected to receive said charge function threshold voltage and said battery terminal voltage signal and operable to provide signals to change the integrated measurement of said integrator in said first direction when said battery terminal voltage signal exceeds the threshold voltage from said charge threshold function generator, and wherein said discharge signal channel includes a voltage comparison circuit connected to receive said discharge function threshold voltage and said battery terminal voltage signal and operable to provide signals to change the integrated measurement of said integrator in said second direction when said battery terminal voltage signal is reduced below the threshold voltage from said discharge threshold function generator.

4. A monitor as claimed in claim 3 wherein said integrator comprises a digital counter and wherein there is included an oscillator means arranged for connection to said counter, and pulse delivery control means actuated by said charge signal channel voltage comparison circuit and by said discharge channel voltage comparison circuit for controlling the delivery of pulses from said oscillator means to said counter to selectively change the integrated measurement in said first direction or in said second direction to respectively indicate increased charge or decreased charge.

5. A monitor as claimed in claim 4 wherein said oscillator is a voltage controlled variable frequency oscillator and wherein an oscillator voltage function generator is provided and connected to generate and supply a voltage for controlling the frequency of said oscillator, said oscillator voltage function generator being connected to receive the feedback signal from said output means and for generating said oscillator voltage function as a function of said feedback signal.

6. A monitor as claimed in claim 4 wherein said oscillator means is operable when said pulse delivery control means is actuated by said charge signal channel to deliver pulses from said oscillator means to said counter at a first frequency, and wherein said pulse delivery control means is operable when actuated by said discharge channel voltage comparison circuit for controlling the delivery of pulses from said oscillator means to said counter at a second frequency which is different from said first frequency.

7. A monitor as claimed in claim 2 wherein said charge threshold function generator and said discharge threshold function generator are both operable to produce functions which are positive functions of the stored state of charge as indicated by the feedback signal.

8. A monitor as claimed in claim 7 wherein said charge function generator and said discharge function generator are each supplied with a constant dc voltage and wherein said function generators are both operable to produce threshold functions which are each a combination function of said fixed dc voltage and the feedback signal.

9. A monitor as claimed in claim 8 wherein at least one of said threshold function generators includes a means for adjusting the slope of the output threshold function.

10. A monitor as claimed in claim 8 wherein at least one of said threshold function generators includes a means for adjusting the absolute level of the output threshold function.

11. A monitor as claimed in claim 8 wherein at least one of said threshold function generators is operable to produce an output threshold function having differnet slopes at different battery charge states.

12. A monitor as claimed in claim 2 wherein said integrator comprises a digital counter, and wherein said output means connected to said integrator for indicating the achieved integration value comprises a digital-to-analog converter.

13. A monitor as claimed in claim 12 wherein a voltmeter is connected to said digital-to-analog converter for providing a visual indication of the value stored in said integrator.

14. A monitor as claimed in claim 13 wherein said digital-to-analog converter comprises a pulse width decode which is operable to generate pulses having proportional widths corresponding to a function of the digital value stored in said digital counter.

15. A monitor as claimed in claim 4 wherein a logic means is provided and connected to said counter to detect the condition when the counter indicates that there is a full battery charge, and means connected to said logic means and operable to discontinue the registration of pulses to be counted in said counter when the condition of said counter indicates a full charge.

16. A monitor as claimed in claim 2 wherein there is provided an alarm means connected to said integrator and operable when said integrator indicates a substantially discharged condition of the battery to provide an alarm signal to warn the operator.

17. A monitor as claimed in claim 2 wherein a load lockout circuit means is connected to said integrator and operable to detect a condition when a substantially complete discharge of the battery is indicated by said integrator, said load lockout circuit means being operable to automatically provide a signal for disconnecting at least a part of the battery load to save the battery from complete discharge and to unequivocally signal the operator that the battery must be recharged.

18. A monitor as claimed in claim 4 wherein there is provided a discharge count means connected to the output of said counter for detecting the condition when the output of said counter indicates a substantially completely discharged battery in terms of the count stored by said counter, a gating means connected between said oscillator pulse gating means and said counter, said last named gating means being connected for control by said discharge count means to prevent the transmission of furhther pulses to said counter.

19. A monitor as claimed in claim 4 wherein there is provided a first gating device connected to receive a plurality of the highest order digit outputs of said counter and operable upon the coincidence of signals from said highest order outputs indicating a discharge condition to provide a first signal, an alarm device connected to receive said first signal for indicating an alarm condition to the operator, a second gating device operable to receive said first signal and connected to receive at least one next lower order output signal from said counter indicative of a discharge condition and operable upon the coincidence of said signals to produce a second signal, a load lockout circuit including a transistor connected to receive said second signal and operable to provide a load lockout switching function to lock out at least a part of the battery load, a third gating device connected to receive said second signal and connected to receive at least one next lower order output signal from said counter and operable upon coincidence of said signals to produce a third signal, a fourth gating device connected to receive said third signal, said fourth gating device being connected between said oscillator pulse delivery control means and said counter and being operable in the presence of said third signal to inhibit the delivery of further pulses to said counter in the discharge direction.

20. A monitor as claimed in claim 2 wherein said integrator comprises a digital counter which is capable of selectively counting up or counting down, said charge signal channel being operable to count the counter in one direction and said discharge signal channel being connected and operable to count said counter in the other direction.

21. A monitor as claimed in claim 4 wherein said counter is operable to selectively count up or count down, said counter being provided with separate inputs to receive up count pulses and down count pulses respectively, said pulse delivery control means comprising separate gates for separately gating pulses from said oscillator to one of said up-down inputs under the control of said charge signal channel voltage comparison circuit and for controlling the delivery of pulses to the other one of said up-down inputs under the control of said discharge channel voltage comparison circuit.

22. A monitor as claimed in claim 21 wherein there is provided a multiple input gating means connected to receive the highest order digit outputs of said counter and operable to produce an output in response to an indicated count from said highest order digit outputs from said counter indicative of a full battery charge, a second gating means connected to receive said output from said multiple input gating means as one input, said second gating means being interposed between said oscillator gating means in said charge signal channel and the up-down counter input which accepts counts indicating a higher charge and operable to prevent the transmission of further pulses to said counter in response to the output signal from said multiple input gating means.

23. A monitor as claimed in claim 4 wherein said charge signal channel further includes a counter set circuit means connected for response to said charge signal channel voltage comparison circuit and connected to said counter and being operable when said battery terminal voltage exceeds the threshold voltage from said charge threshold function generator to set said counter to a full charge condition, said output means then being operable to indicate a full charge and to provide a feedback signal to said function generators indicative of full charge, charge adjustment cycle circuit means connected to said counter for detecting the full charge condition of said counter and operable to initiate a charge adjustment cycle, said pulse delivery control means comprising a transfer gate circuit normally operable to connect signals from said discharge channel voltage comparison circuit to control the delivery of pulses to said counter to indicate decreased charge, said transfer gate circuit being connected for actuation by said charge adjustment cycle initiation means to cause said transfer gate means to transfer control of said counter to said charge signal channel voltage comparison circuit to cause said counter to be counted to a value corresponding to the achieved charge as indicated by a comparison of the voltage indicative of battery terminal voltage and the changing charge function generator output in response to the changing feedback voltage as the count in said counter is changed towards a lower charge indication status.

24. A monitor as claimed in claim 23 wherein said counter set circuit means includes a time delay means which delays the operation of said counter set circuit means to set said counter to a full charge condition until said battery terminal voltage has exceeded the threshold voltage for a predetermined interval of time.

25. A monitor as claimed in claim 23 wherein said charge adjustment cycle circuit means comprises a single shot circuit.

26. A monitor as claimed in claim 25 wherein a connection is provided from said charge adjustment cycle initiation means to said charge threshold function generator and operable during the charge adjustment cycle to change the output of said charge threshold function generator in a direction indicative of a higher achieved charge condition to prevent recycling of the charge adjustment cycle.

27. A monitor as claimed in claim 23 wherein said digital counter is capable of operation in a fast count mode in response to a fast count control input, and wherein there is provided a connection from said charge adjustment cycle circuit means to said fast control input for operating said digital counter in said fast count mode during the charge adjustment cycle.

28. A monitor as claimed in claim 23 wherein an oscillator frequency control means is provided and connected to said oscillator for selectively increasing the frequency of said oscillator, and wherein there is provided a connection from said charge adjustment cycle circuit means to said oscillator frequency control means to increase the frequency of said oscillator during said charge adjustment cycle.

29. A monitor as claimed in claim 23 wherein there is provided a voltage track-and-hold circuit connected to receive the output voltage signal from said output means connected to said integrator, a voltmeter connected to said track-and-hold circuit to receive the output voltage from said output means for providing a visual indication of the state of charge, a gating means for selectively connecting and disconnecting said track-and-hold circuit with said output means, and a connection from said charge adjustment cycle circuit means to said track-and-hold circuit gating means to disconnect said track and hold circuit from said output means during said charge adjustment cycle to hold the meter reading constant during the chage adjustment cycle.

30. A monitor as claimed in claim 23 wherein said charge signal channel includes a selectively controllable gating means and a track-and-hold circuit for tracking and holding the battery terminal voltage as received by said charge signal channel, said charge adjustment cycle circuit means including a connection to said track-and-hold gating means for disconnecting said track-and-hold circuit means from said battery terminal voltage signal during the charge adjustment cycle so as to isolate the charge signal channel from fluctuations in battery terminal voltage occurring during the charge adjustment cycle.

31. A monitor as claimed in claim 3 wherein at least one of said charge and discharge signal channels includes a single shot circuit connected between the associated signal channel voltage comparison circuit and said integrator, said single shot circuit being operable in response to an output from the associated voltage comparison circuit to provide an output pulse to said integrator to change the integrated measurement of said integrator each time the battery voltage measurement crosses the associated voltage threshold.

32. A monitor as claimed in claim 3 wherein said integrator comprises a digital counter and wherein at least one of said charge and discharge signal channels includes a resettable voltage integrator connected between the associated voltage comparison circuit and said counter, said resettable integrator comprising a means for integrating both the time and amplitude of excursions of the battery terminal voltage signal beyond the associated voltage threshold and for generating an output pulse to be counted in said counter whenever a predetermined integration value is achieved, said resettable integrator being operable to reset to recommence an integration cycle each time an output pulse is produced thereby.

33. A monitor as claimed in claim 32 wherein said resettable voltage integrator is operable to integrate successive excursions of the battery terminal voltage signal beyond said associated voltage threshold until said predetermined integrating value is achieved.

34. A monitor as claimed in claim 32 wherein a means is provided for resetting said resesttable integrator whenever the battery terminal voltage signal returns to a value within the associated voltage threshold.

35. A monitor as claimed in claim 34 including a single shot circuit means connected for enabling said resettable integrator whenever the battery terminal voltage signal goes beyond the associated voltage threshold, said single shot circuit means being operable to remove the enabling signal from said resettable integrator and to reset said resettable integrator at the end of a predetermined time interval.

* * * * *

UNITED STATES PATENT AND TRADEMARK OFFICE
CERTIFICATE OF CORRECTION

PATENT NO. : 4,740,754
DATED : April 26, 1988
INVENTOR(S) : Eugene P. Finger

Page 1 of 2

It is certified that error appears in the above-identified patent and that said Letters Patent are hereby corrected as shown below:

Column 5, line 51, "gates" should read --gated--.

Column 8, lines 27-28, "characteristics" should read --characteristic--.

Column 8, line 29, "105" should read --106--.

Column 11, line 12, "compare in" should read --compared in--.

Column 11, line 57, "functional" should read --function--.

Column 12, line 43, "measure" should read --measured--.

Column 16, line 15, "on output" should read --an output--.

Column 17, line 55, "of feedback" should read --of said feedback--.

Column 19, line 7, "decode" should read --decoder--.

UNITED STATES PATENT AND TRADEMARK OFFICE
CERTIFICATE OF CORRECTION

PATENT NO. : 4,740,754

DATED : April 26, 1988

INVENTOR(S) : Eugene P. Finger

It is certified that error appears in the above-identified patent and that said Letters Patent is hereby corrected as shown below:

Column 22, line 34, "integrating" should read --integration--.

Signed and Sealed this

Twenty-seventh Day of September, 1988

*Attest:*

DONALD J. QUIGG

*Attesting Officer*      *Commissioner of Patents and Trademarks*